United States Patent
Karlsson et al.

(10) Patent No.: US 8,442,573 B2
(45) Date of Patent: May 14, 2013

(54) BEST-EFFORT MACRO DIVERSITY

(75) Inventors: Patrik Karlsson, Älta (SE); Eva Englund, Linköping (SE); Fredrik Gunnarsson, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 790 days.

(21) Appl. No.: 12/301,204

(22) PCT Filed: May 17, 2006

(86) PCT No.: PCT/SE2006/050126
§ 371 (c)(1),
(2), (4) Date: Nov. 17, 2008

(87) PCT Pub. No.: WO2007/133132
PCT Pub. Date: Nov. 22, 2007

(65) Prior Publication Data
US 2009/0186617 A1 Jul. 23, 2009

(51) Int. Cl.
*H04B 7/216* (2006.01)
*H04B 7/185* (2006.01)
*H04B 7/00* (2006.01)
*H04W 4/00* (2009.01)
*H04W 72/00* (2009.01)

(52) U.S. Cl.
USPC ........... 455/522; 455/450; 370/335; 370/329; 370/318

(58) Field of Classification Search .................. 455/522, 455/450; 370/318, 335, 329
See application file for complete search history.

(56) References Cited

U.S. PATENT DOCUMENTS

| 6,262,980 B1 * | 7/2001 | Leung et al. .................. 370/336 |
| 6,405,021 B1 * | 6/2002 | Hamabe .......................... 455/69 |
| 6,615,044 B2 * | 9/2003 | Tigerstedt et al. ............ 455/437 |

(Continued)

FOREIGN PATENT DOCUMENTS

| WO | WO 01/20942 A1 | 9/2000 |
| WO | WO 03/067789 A1 | 8/2003 |

OTHER PUBLICATIONS

"WDMCA Enhanced Uplink—Principles and Basic Operation" Vehicular Technology Conference, 2005. VTC-2005-Spring vol. 3 pp. 1411-1415.

(Continued)

*Primary Examiner* — Bobbak Safaipour

(57) ABSTRACT

The present invention relates to a network node and a method for providing macro diversity in a radio telecommunications network comprising a radio base station providing a radio link to a mobile terminal, the radio base station comprises communication resources for supporting the radio link to the mobile terminal and for supporting transmission of data between the mobile terminal and a network node. The invention comprises: —receiving a signal from the mobile terminal; estimating a signal quality parameter for the received signal; sending a first message to the mobile terminal instructing the mobile terminal to adjust at least a first transmission parameter if the signal quality parameter is below a quality target; and if the signal quality parameter is above the quality target, and if lack of the resources prevents the radio base station to relay data between the mobile terminal and the network node, sending the first message to the mobile terminal instructing the mobile terminal to adjust the at least one transmission parameter.

19 Claims, 2 Drawing Sheets

U.S. PATENT DOCUMENTS

| | | | |
|---|---|---|---|
| 6,718,180 B1* | 4/2004 | Lundh et al. | 455/522 |
| 7,352,722 B2* | 4/2008 | Malladi et al. | 370/335 |
| 2002/0137514 A1* | 9/2002 | Mitsugi et al. | 455/436 |
| 2002/0187784 A1* | 12/2002 | Tigerstedt et al. | 455/439 |
| 2003/0176190 A1* | 9/2003 | Mohebbi et al. | 455/436 |
| 2003/0186653 A1* | 10/2003 | Mohebbi et al. | 455/67.11 |
| 2003/0210668 A1* | 11/2003 | Malladi et al. | 370/335 |
| 2004/0209618 A1 | 10/2004 | Niemela et al. | |
| 2006/0105796 A1* | 5/2006 | Malladi et al. | 455/522 |
| 2006/0140250 A1* | 6/2006 | Kim et al. | 375/130 |
| 2006/0246936 A1* | 11/2006 | Gross et al. | 455/522 |
| 2006/0262754 A1* | 11/2006 | Andersson et al. | 370/332 |
| 2006/0262840 A1* | 11/2006 | Wang et al. | 375/221 |
| 2007/0217348 A1* | 9/2007 | Tapia Moreno et al. | 370/278 |
| 2008/0123601 A1* | 5/2008 | Malladi et al. | 370/335 |
| 2009/0052322 A1* | 2/2009 | Simonsson et al. | 370/235 |

OTHER PUBLICATIONS

B G Marchent, M J McTiffin: "Handover and Macro Diversity for $3^{rd}$ Generation Mobile Systems within ATM Fixed Networks" Global Telecommunications Conference, 1996. pp. 1151-1155.

M. Torii, et al. :"Optimization of Signal Level Thresholds in Mobile Networks" IEEE $55^{th}$ Vehicular Technology Conference VTC May 6-9, 2002.

* cited by examiner

BEST-EFFORT MACRO DIVERSITY

TECHNICAL FIELD

The present invention relates to the field of radio telecommunications. More specifically, the present invention relates to improved macro diversity in a radio telecommunications network.

BACKGROUND OF THE INVENTION

In some cellular mobile communication systems, such as CDMA systems (WCDMA and CDMA2000), a mobile terminal can communicate via several base stations or cells simultaneously; this is commonly referred to as macro diversity. Macro diversity has advantages such as providing improved coverage and capacity and improving user perceived quality. In the downlink (DL) the terminal can combine the transmission from all the cells involved, i.e. the active set, to get a better signal quality. The improved signal quality can be used to increase data rates, reduce delays and/or transmission power to obtain higher capacity. In the uplink (UL) all cells in the active set receive the signal from the mobile terminal and the transmission is successful if any of the cells can detect the signal. By adjusting the power to the momentarily best link the terminal can then use lower power and/or higher data rate. Macro diversity is more suitable for uplink transmission since no addition power or interference is needed.

The advantages of uplink macro diversity come with a cost of increased complexity and increased demand for hardware and transport resources in the network. All cells involved in the reception must reserve hardware resources for detection and decoding, also additional transport and processing recourses are needed. In current systems the set of cells that are included in the active set is based on radio propagation conditions, other resources are not considered. Furthermore, all cells that are included in the active set must participate in the reception.

In recent evolution of the uplink in CDMA systems such as the enhanced WCDMA uplink a fast scheduling functionality is introduced in the base station to improve resource management. Fast scheduling denotes the possibility for the base station to control when a mobile terminal is allowed transmit and at what rate. This enables fast reaction to the users momentary traffic demand and overload situations. Provided suitable estimates of the cell load, the system can be operated close to the maximum load limit providing improved user data rates as well as improved uplink capacity. In case of macro diversity, when two or more cells are involved in the reception, a serving cell is appointed with the main responsibility for scheduling the terminals transmission. The other cells in the active set may also influence the terminals transmission rate, but only in case the interference in the cell is too large. The non-serving cells may not reduce the terminal rate due to lack of other resources, such as hardware, processing or transport resources.

FIG. 1 shows a simplified illustration of the fast scheduling concept for enhanced uplink WCDMA. The mobile terminal request permission to transmit through a scheduling request. The scheduling request may for example consist of an "unhappy" indication from the happy bit included in the E-DPCCH (Enhanced Dedicated Channel (E-DCH) Dedicated Control Channel) or a scheduling information containing more details on the resource demands. The serving cell schedules the terminal and transmits a grant through the Enhanced Dedicated Channel (E-DCH) Absolute Grant Channel (E-AGCH). The grant allows the terminal to transmit non-scheduled data flows and sets an upper limit on the transport format, or rate, that the terminal may use. The grant can further be modified with the Relative Grant Channel (E-RGCH). For example, if the interference is too large, the non-serving cells in the active set may also influence the terminals rate through the E-RGCH.

The non-serving cells are not in advance aware of when and at what rate the serving cell will grant the terminal. In current solutions the non-serving cells must always be prepared and allocate hardware and other resources for the maximum possible rate. Due to limited resources the maximum rate allowed in Soft or Softer Handover (SHO) is then quite limited.

Alternatively the non-serving cell does not reserve or pre-allocate resources, but only allocates resources when needed, i.e. when the terminal starts to transmit. The problem with this solution is that it takes some time to allocate resources, specifically hardware, and during this time the non-serving cell will not be able to receive the signal. The serving cell may not necessarily have the best uplink signal quality due multi-path fading and/or uplink/downlink mismatch. In these cases the terminal transmission power will be adjusted to the best of the non-serving cells and there is a risk none of the cells will be able to receive the transmission. If none of the cells are able to detect the signal for some time this will give rise to a number of undesirable effects such as delay and impaired end-user quality as well as inefficient resource usage.

SUMMARY OF THE INVENTION

It is an object of one aspect of the present invention to provide such apparatus and method that provides improved macro diversity handling in a radio telecommunications system.

One object according to an aspect of the invention is to provide means and methods for improving the reception of a data transmission to or from a mobile terminal.

One object according to an aspect of the invention is to provide means and methods for improving the reception of a data transmission to or from a mobile terminal during soft handover in a WCDMA system.

One object according to an aspect of the invention is to provide means and methods to prevent retransmissions and delays in a data transmission to or from a mobile terminal due to lack of resources at a radio base station.

These objects among others are, according to one aspect of the present invention, attained by a method for providing macro diversity in a radio telecommunications network comprising a radio base station providing a radio link to a mobile terminal, the radio base station comprises communication resources for supporting the radio link to the mobile terminal and for supporting transmission of data between the mobile terminal and a network node.

The method comprises the steps of: —receiving a signal from the mobile terminal; estimating a signal quality parameter for the received signal; sending a first message to the mobile terminal instructing the mobile terminal to adjust at least a first transmission parameter if the signal quality parameter is below a quality target; and if the signal quality parameter is above the quality target, and if lack of the resources prevents the radio base station to relay data between the mobile terminal and the network node, sending the first message to the mobile terminal instructing the mobile terminal to adjust the at least one transmission parameter.

These objects among others are, according to another aspect of the present invention, attained by a radio base station in a radio telecommunications network providing a radio link to a mobile terminal, comprising communication resources for supporting the radio link to the mobile terminal and for supporting transmission of data between the mobile terminal and a network node.

The radio base station comprises a signal quality estimator for estimating a signal quality parameter for a signal received from the mobile terminal, wherein the radio base station is provided to send a first message to the mobile terminal instructing the mobile terminal to adjust at least one transmission parameter if the signal quality parameter is below a signal quality target; and the radio base station is provided to, if the signal quality parameter is above the quality target, and if lack of the resources prevents the radio base station to relay data between the mobile terminal and the network node, send the first message to the mobile terminal instructing the mobile terminal to adjust the transmission parameter.

By considering also resources in the radio base station required to relay data received from the mobile terminal when deciding to send messages to the mobile terminal affecting transmission parameters a better and more effective performance can be achieved.

According to one variant of an aspect according to the present invention the signal quality parameter is SIR and the at least one transmission parameter is the power output of the mobile terminal.

According to one variant of an aspect according to the present invention the first message is an UP-message instructing the mobile terminal to increase its output transmission power.

According to one variant of an aspect according to the present invention the signal quality parameter is selected from a group of parameters comprising: SIR; gain; and channel quality index.

According to one variant of an aspect according to the present invention the transmission parameter is selected from a group of parameters comprising: bit rate; coding scheme; modulation scheme; and transmission power.

By sending an UP-message to the mobile terminal from the radio base station, if the radio base station lacks the resources to handle the data transmission, the mobile terminal may adjust its transmission power to other radio base stations in the neighbourhood, or active set.

Thus, the mobile terminal may continue to transmit data, through other radio base stations, even if the current radio base station is not able to treat the received data due to lack of resources.

This is achieved since the radio base station having a lack of resources does not limit the mobile terminal output power by sending a DOWN-message even though the received signal is strong enough. Thus, the mobile terminal can adjust its transmission power to another radio base station having the resources needed to receive the data. That is, a radio base station which may require a higher transmission power, and which would not be able to receive the data transmission would the first radio base station send a DOWN-message.

According to one variant of an aspect according to the present invention a DOWN-message is sent to the mobile terminal instructing the mobile terminal to lower its transmission power if the SIR is above the SIR target. The DOWN-message is only sent if there is enough resources available in the radio base station to treat the data transmission According to one variant of an aspect according to the present invention the mobile terminal is in soft handover, and the radio base station is a non-serving radio base station in an active set for receiving data transmission from the mobile terminal.

The present invention is particularly applicable and useful during soft handover in a radio telecommunications system where a multitude of radio base stations may simultaneously receive a transmission from a mobile terminal.

According to one variant of an aspect according to the present invention the SIR target is received from the network node. The SIR target may be sent to the radio base station from a network node having information about the reception outcome for a multitude of radio base stations, such as the radio base stations in the active set.

According to one variant of an aspect according to the present invention the UP-message is a Transmission Power Control command UP, and the DOWN-message is a Transmission Power Control command DOWN, as in a WCDMA telecommunications system.

According to one variant of an aspect according to the present invention the resources are selected from a group of resources comprising: hardware resources; processing resources; and link capacity resources between the radio base station and the network node.

Thus, if the radio base station lacks hardware and/or processing resources to detect and decode the data transmission from the mobile terminal or if the link capacity for transmitting the received data forward in the network is exhausted, the RBS will send a TPC command UP regardless of if the estimated SIR value is above the SIR target.

According to one variant of an aspect according to the present invention the network is a WCDMA network, the radio base station is a Node B and the network node is a radio network controller (RNC). The present invention is particularly useful in CDMA telecommunications system.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 3, which are given by way of illustration only, and thus are not limitative of the present invention.

DETAILED DESCRIPTION OF DIFFERENT ASPECTS OF THE INVENTION

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
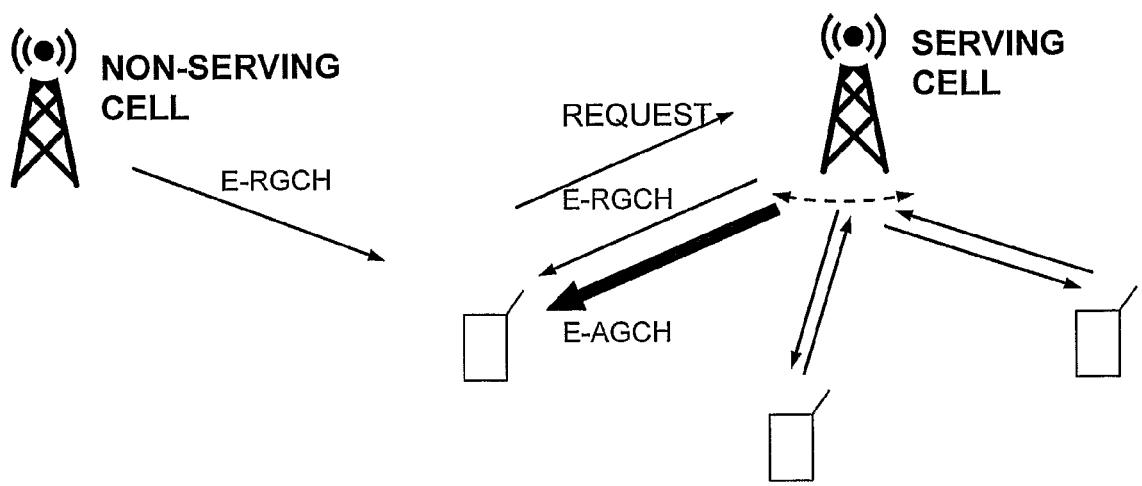
FIG. 1 is a schematic diagram of scheduling of transmission resources in a WCDMA network.

FIG. 1 is a schematic diagram according to prior art and has been briefly discussed previously and will thus not be further dealt with here.

Figure 2:
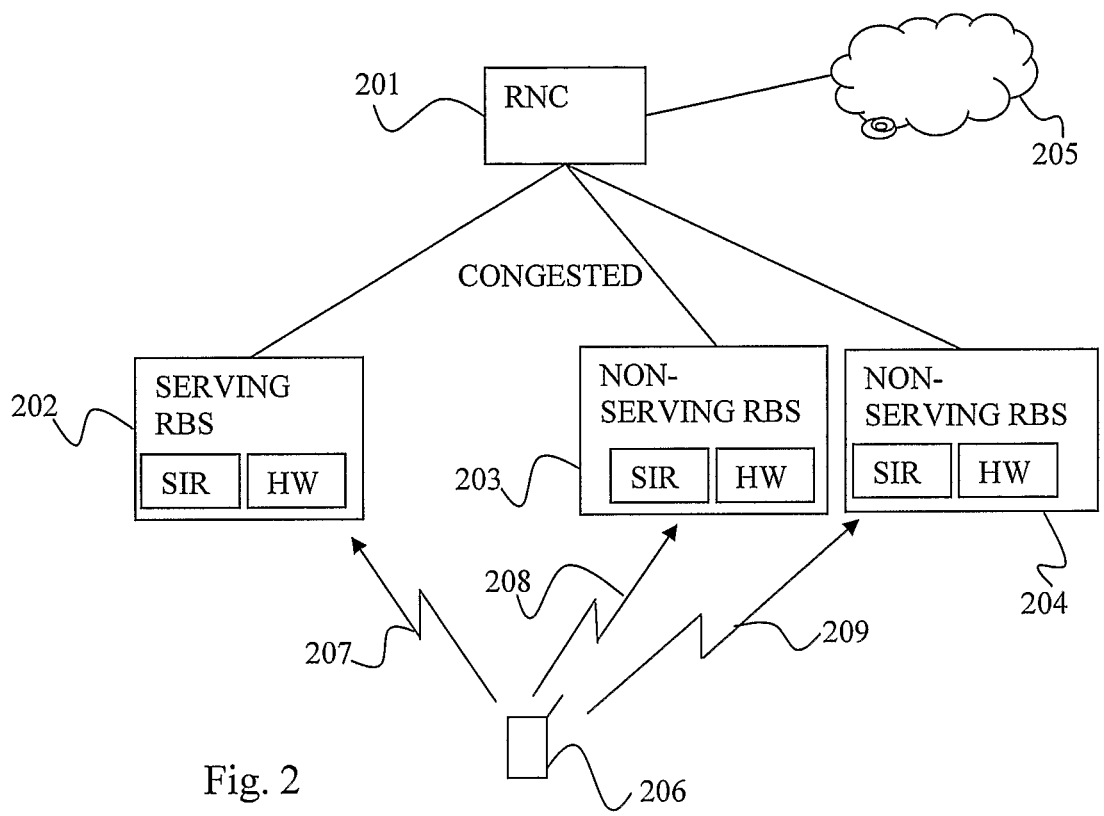
FIG. 2 is a schematic block diagram according to one aspect of the present invention.

FIG. 2 is a schematic block diagram according to one aspect of the present invention showing a Radio Network Controller (RNC) 201 connected through data transmission links to a first Radio Base Station (RBS) 202, a second RBS 203 and a third RBS 204. The RNC 201 is further connected to a core network 205. The first, second and third RBS each comprises a Signal-to-Interference-and-noise Ratio (SIR) estimator and hardware, as well as processing resources (not shown).

The first RBS 202 is connected as a serving RBS to a mobile terminal, or User Equipment (UE), 206 over a radio air interface as is indicated by the flash arrow 207. Thus, the UE 206 sends and/or receives data via the air interface, the first RBS 202 and the RNC 201 to/from the core network 205.

However, the UE 206 has informed the RNC 201 through measurement reports that also the second and third RBS 203 and 204, respectively, has acceptable radio transmission characteristics. The Radio Resource Control (RRC) in the RNC has added the second and third RBS to the active set and informs the involved RBS that the UE is in soft handover. The second and third RBS take on the role as non-serving RBS:es, and the UE 206 is thus in soft handover (SHO), and the second and third RBS will attempt to receive transmissions from the UE 206 as is indicated by the flash arrows 208 and 209, respectively.

The RNC 201 sends a signal-to-Interference-and-noise Ratio (SIR) target to the first, second and third RBS 203 and 204, respectively. The initial SIR target is based on the type of radio bearer that is set-up for the specific user. Thus, if the RNC 201 receives a greater extent of faulty blocks from it will increase the SIR-target and vice versa. The RBS may then instruct the UE 206 to adapt its transmission power and thus the signal strength by sending TPC commands UP and DOWN, respectively to reach the SIR target. The RNC 201 determines the SIR-target based on the combined outcome of all the transmissions to the RBS in the active set. Typically the SIR target is increased if none of the RBS in the active set could decode the transmission.

Consequently, the second and third, as well as the first, RBS estimates the SIR value based on the signal strength for the Dedicated Physical Control Channel (DPCCH). If the estimated SIR value is below the target received from the RNC 201 the respective RBS will send a Transmission Power Control (TPC) command UP to the UE 206, and if the estimated SIR value is above the target the RBS will send a TPC command DOWN to the UE 206. The UE 206 will increase its transmission power as long as it only receives TCP commands UP, but as soon as one RBS sends a TCP command DOWN the UE 206 will reduce its output power. Thus, the terminal adapts its transmission power output to the best available radio link; that is to the radio link to the RBS sending the TCP command DOWN. The other RBS may possibly be able to receive the transmission to some extent and the contribution from all RBS will be combined in the RNC 201.

In the present example, the second RBS 203 is the one with the best radio reception characteristics, and would have been the RBS sending a TCP command DOWN to the UE 206, prior to the present invention. However, the Iub link from the second RBS 203 to the RNC 201 is in this example currently congested. This may depend on a number of different things such as high traffic load during peak hour etc. Thus, if the second RBS 203 would send a TPC command DOWN to the UE 206, the second RBS 203 would still not be able to forward the data received to the RNC 201 for combining. It is in this circumstances a risk that neither the serving RBS 202 or the third RBS 204 is able to receive the transmission, since the second RBS has limited the transmission power from the UE 206, and that thusly loss of data would be the effect.

According to the present invention, however, the second RBS detects that there is a lack of Iub link capacity and refrains from sending the TPC command DOWN and instead sends a TPC command UP, despite that the signal quality is above the SIR target received from the RNC 201. This would also be the case if there was a lack of hardware or processing capabilities in the second RBS 203. Thus, the UE 206 increase its output power until the first, or third RBS 202 or 204, respectively, sends a TPC command DOWN, given of course that the particular RBS has available the required resources. Later the congestion situation may be resolved in the second RBS 203, which may then adapt the transmission power used by the UE 206 by sending TPC command DOWN.

Figure 3:
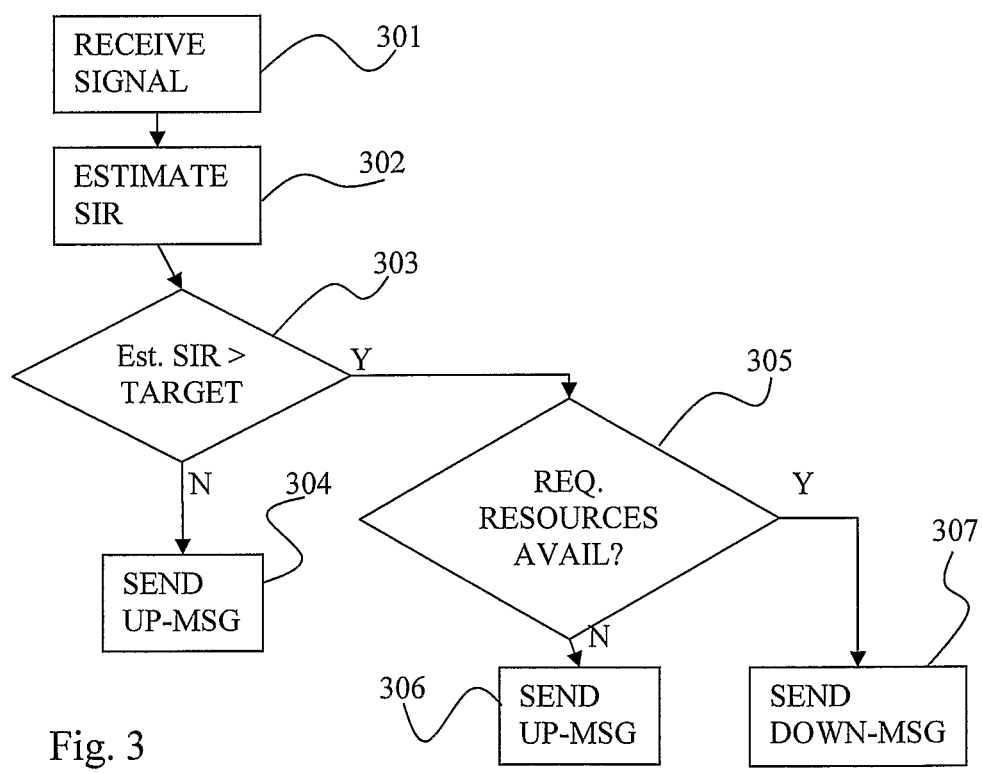
FIG. 3 is a schematic flow diagram according to one aspect of the present invention.

FIG. 3 is a schematic flow diagram according to one aspect of the present invention of a method to be executed in a radio base station.

In step 301 a DPCCH signal is received and the Signal-to-Interference-and-noise Ratio is estimated 302. If the estimated SIR value is less than a SIR target 303 a TPC command UP is sent 304 to the UE 206. If the estimated SIR value is greater than the SIR target 303 a further check is made 305 to verify if the required resources are available to support the transmission rate. If the required resources are available a TPC command UP is sent 306 to the UE 206. However, if the required resources are not available a TPC command DOWN is sent 307 to the UE 206 despite that the estimated SIR value is above the SIR target. Thus, lack of resources will not unnecessarily degrade data transmission from the UE 206.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A method for providing macro diversity in a radio telecommunications network having a radio base station for providing a radio link to a mobile terminal, wherein said radio base station includes communication resources for supporting said radio link to said mobile terminal and for supporting transmission of data between said mobile terminal and a network node, said method comprising the steps of:
   receiving a signal from said mobile terminal;
   estimating a signal quality parameter for said received signal;
   sending a first message to said mobile terminal instructing said mobile terminal to adjust at least a first transmission parameter if said signal quality parameter is below a quality target; and,
   if said signal quality parameter is above said quality target, and if either said radio base station lacks communication resources to detect and decode data from the mobile terminal or if a link capacity for transmitting received data forward in the network is exhausted, sending said first message to said mobile terminal instructing said mobile terminal to adjust said at least one transmission parameter.

2. The method according to claim 1, wherein said signal quality parameter is SIR and said at least one transmission parameter is the power output.

3. The method according to claim 1, wherein said first message is an UP-message instructing said mobile terminal to increase its output transmission power.

4. The method according to claim 1, wherein said signal quality parameter is selected from a group of parameters comprising: SIR; gain; and channel quality index.

5. The method according to claim 1, wherein said transmission parameter is selected from a group of parameters comprising: bit rate; coding scheme; modulation scheme; and transmission power.

6. The method according to claim 2, comprising the further step of if said SIR is above said SIR target, sending a DOWN-message to said mobile terminal instructing said mobile terminal to lower its transmission power.

7. The method according to claim 2, wherein said mobile terminal is in soft handover, and said radio base station is a non-serving radio base station for said mobile terminal.

8. The method according to claim 1, wherein said signal quality parameter is a SIR value, and said method further comprises the step of receiving said quality target, as a SIR target, from said network node.

9. The method according to claim 1, wherein said resources are selected from a group of resources comprising: hardware resources; processing resources; and link capacity resources between said radio base station and said network node.

10. The method according to claim 1, wherein said network is a WCDMA network, said radio base station is a Node B and said network node is a radio network controller.

11. A radio base station in a radio telecommunications network providing a radio link to a mobile terminal, said radio base station comprising communication resources for supporting said radio link to said mobile terminal and for supporting transmission of data between said mobile terminal and a network node, said radio base station comprising:

a signal quality estimator for estimating a signal quality parameter for a signal received from said mobile terminal; wherein:

said radio base station is adapted to send a first message to said mobile terminal instructing said mobile terminal to adjust at least one transmission parameter if said signal quality parameter is below a signal quality target; and, said radio base station is adapted to, if said signal quality parameter is above said quality target and if either said radio base station lacks communication resources to detect and decode data from the mobile terminal or if a link capacity for transmitting received data forward in the network is exhausted, send said first message to said mobile terminal instructing said mobile terminal to adjust said transmission parameter.

12. The radio base station according to claim 11, wherein said signal quality parameter is SIR and said at least one transmission parameter is the power output.

13. The radio base station according to claim 11, wherein said first message is an UP-message instructing said mobile terminal to increase its output transmission power.

14. The radio base station according to claim 11, wherein said signal quality parameter is selected from a group of parameters comprising: SIR; gain; and channel quality index.

15. The radio base station according to claim 11, wherein said transmission parameter is selected from a group of parameters comprising: bit rate; coding scheme; modulation scheme; and transmission power.

16. The radio base station according to claim 11, wherein said mobile terminal is in soft handover, and said radio base station is a non-serving radio base station for said mobile terminal.

17. The radio base station according to claim 12, wherein said radio base station is provided to receive said SIR target from said network node.

18. The radio base station according to claim 11, wherein said resources are selected from a group of resources comprising: hardware resources; processing resources; and link capacity resources between said radio base station and said network node.

19. The radio base station according to claim 11, wherein said network is a WCDMA network, said radio base station is a Node B and said network node is a radio network controller.

* * * * *